(12) United States Patent
Cierniak et al.

(10) Patent No.: US 8,838,619 B1
(45) Date of Patent: Sep. 16, 2014

(54) RANKING AUTHORS AND THEIR CONTENT IN THE SAME FRAMEWORK

(75) Inventors: Michal Cierniak, Palo Alto, CA (US); Na Tang, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/616,153

(22) Filed: Sep. 14, 2012

Related U.S. Application Data

(63) Continuation of application No. 13/407,174, filed on Feb. 28, 2012, now Pat. No. 8,396,879, which is a continuation of application No. 12/540,024, filed on Aug. 12, 2009, now Pat. No. 8,150,860.

(51) Int. Cl.
*G06F 7/00* (2006.01)
*G06F 17/30* (2006.01)

(52) U.S. Cl.
USPC .......................................... 707/750; 715/233

(58) Field of Classification Search
None
See application file for complete search history.

(56) References Cited

U.S. PATENT DOCUMENTS

| | | | |
|---|---|---|---|
| 6,968,511 B1 | 11/2005 | Robertson et al. | |
| 7,130,470 B1 * | 10/2006 | Ho | 382/229 |
| 7,853,622 B1 | 12/2010 | Baluja et al. | |
| 8,150,860 B1 | 4/2012 | Cierniak et al. | |
| 8,468,083 B1 * | 6/2013 | Szulczewski | 705/37 |
| 8,548,995 B1 * | 10/2013 | Curtiss | 707/731 |
| 2003/0046098 A1 * | 3/2003 | Kim | 705/1 |
| 2005/0060311 A1 * | 3/2005 | Tong et al. | 707/7 |
| 2005/0210042 A1 * | 9/2005 | Goedken | 707/100 |
| 2005/0262050 A1 | 11/2005 | Fagin et al. | |
| 2007/0005686 A1 | 1/2007 | Fish et al. | |
| 2007/0011073 A1 | 1/2007 | Gardner et al. | |
| 2007/0011155 A1 | 1/2007 | Sarkar | |
| 2007/0112761 A1 | 5/2007 | Xu et al. | |
| 2007/0198510 A1 * | 8/2007 | Ebanks | 707/5 |
| 2008/0005064 A1 | 1/2008 | Sarukkai | |
| 2008/0189272 A1 * | 8/2008 | Powers et al. | 707/5 |
| 2008/0275861 A1 | 11/2008 | Baluja et al. | |
| 2009/0106232 A1 * | 4/2009 | Burges et al. | 707/5 |
| 2009/0265607 A1 | 10/2009 | Raz et al. | |

(Continued)

FOREIGN PATENT DOCUMENTS

| | | | |
|---|---|---|---|
| WO | WO 0180084 A2 * | 10/2001 | |
| WO | WO 2008021180 A2 * | 2/2008 | |
| WO | WO 2008024516 A2 * | 2/2008 | |
| WO | WO 2009086236 A2 * | 7/2009 | |

OTHER PUBLICATIONS

Ziyu Guan et al., "Personalized Tag Recommendation Using Graph-based Ranking on Multi-type Interrelated Objects", SIGIR '09, Jul. 19-23, 2009, Boston, MA, pp. 540-547.

(Continued)

*Primary Examiner* — Augustine K Obisesan
(74) *Attorney, Agent, or Firm* — Harrity & Harrity, LLP

(57) ABSTRACT

One or more server devices may simultaneously calculate first ranking scores for a group of users and second ranking scores for a group of comments authored by the group of users. The calculating may occur during a same process. The one or more server devices may further provide one of a first ranked list that includes information identifying the group of users, the information identifying the group of users being ordered based on the first ranking scores, or a second group of comments of the group of comments, the comments in the second group of comments being ordered based on the second ranking scores.

20 Claims, 17 Drawing Sheets

(56) References Cited

U.S. PATENT DOCUMENTS

2009/0327243 A1* 12/2009 Pradhan et al. .................. 707/3
2010/0083173 A1    4/2010 Germann et al.
2010/0185509 A1*  7/2010 Higgins et al. ............ 705/14.49
2011/0029564 A1    2/2011 Graham et al.

OTHER PUBLICATIONS

Elaine Toms et al., "Measuring User Perceptions of Web Site Reputation", Elsevier—Information Processing and Management, vol. 40, 2004, pp. 291-317.

Elke Michlmayr et al., "Learning User Profiles from Tagging Data and Leveraging Them for Personal(ized) Information Access", WWW2007, May 8-12, 2007, 8 pages.

Yang Song et al., "Real-time Automatic Tag Recommendation", SIGIR '08, Jul. 20-24, 2008, pp. 515-522.

Manish Gupta et al., "Survey on Social Tagging Techniques", SIGKDD Explorations, vol. 12, Issue 1, pp. 58-72, Jun. 2010.

Dong Liu et al., "Tag Ranking", WWW 2009 Madrid, Track: Rich Media/Session: Tagging and Clustering, Apr. 20-24, 2009, pp. 351-360.

Harry Halpin et al., "The Dynamics and Semantics of Collaborative Tagging", Proceedings of the 1$^{st}$ Semantic Authoring and Annotation Workshop, 2006, 10 pages.

Andriy Shepitsen et al., "Personalized Recommendation in Social Tagging Systems Using Hierarchical Clustering", RecSys '08, Oct. 23-25, 2008, pp. 259-266.

Amazon's Top Customer Reviewers, http://www.amazon.com/review/top-reviewers, Aug. 6, 2009 (print date), 2 pages.

Co-pending U.S. Appl. No. 13/407,174, filed Feb. 28, 2012, entitled "Ranking Authors and Their Content in the Same Framework", by Michal Cierniak et al., 45 pages.

* cited by examiner

USER RANKINGS

| RANK | USER | NO. OF COMMENTS |
|---|---|---|
| 1 | PAUL BUNYAN | 10,432 |
| 2 | RUTH BUZZARD | 8,883 |
| 3 | ANDY BENDICT | 12,841 |
| 4 | GLEN CANDLE | 10,006 |
| 5 | ANGELA ARDEN | 8,547 |

FIG. 17

RANKING AUTHORS AND THEIR CONTENT IN THE SAME FRAMEWORK

RELATED APPLICATIONS

This application is a continuation of U.S. patent application Ser. No. 13/407,174, filed Feb. 28, 2012, which is a continuation of U.S. patent application Ser. No. 12/540,024, filed on Aug. 12, 2009 (now U.S. Pat. No. 8,150,860), the disclosures of which are hereby incorporated by reference herein.

BACKGROUND

Some systems rely on users to provide content and rate content provided by other users. For example, Amazon.com allows users to review products offered on that web site. In this situation, reviewer reputation may be used in determining the quality of the reviews provided by that reviewer.

SUMMARY

According to one implementation, a method may be performed by one or more server devices. The method may include simultaneously calculating, using a processor of the one or more server devices, first ranking scores for a group of users and second ranking scores for a group of comments authored by the group of users, the simultaneously calculating occurring during a same process. The method may further include providing, using a processor of the one or more server devices, one of a first ranked list that includes information identifying the group of users or a first group of comments of the group of comments. The information identifying the group of users being ordered based on the first ranking scores. The comments in the first group of comments being ordered based on the second ranking scores.

According to another implementation, one or more server devices may include a processor and a memory. The processor may simultaneously determine, during a same process, first ranking scores, for a group of users, and second ranking scores, for a group of comments authored by the group of users; when simultaneously determining the first ranking scores and the second ranking scores, the processor may cause reputations of the group of users to be conveyed to the group of comments, a reputation of at least one user of the group of users to be conveyed to at least one other user of the group of users, and indications of quality of the group of comments to be conveyed to the group of users; rank the group of users using the first ranking scores; and rank a first group of comments, from the group of comments, using the second ranking scores. The memory may store the first ranking scores, and store the second ranking scores.

According to yet another implementation, a system may include one or more devices. The one or more devices include means for calculating a first ranking score for a user and a second ranking score for a comment authored by the user, the first ranking score and the second ranking score being calculated during a same process. The means for calculating includes means for transferring a reputation of the user to the comment, means for transferring an indication of quality of the comment to the user, and means for transferring a reputation of another user to the user. The one or more devices further include at least one of means for providing a list of users, the user being placed in the list of users at a location based on the first ranking score, or means for providing a list of comments, the comment being placed in the list of comments at a location based on the second ranking score.

According to a further implementation, a computer-readable medium may contain instructions executable by one or more devices. The computer-readable medium may include one or more instructions to represent a group of users as first nodes; one or more instructions to represent a group of comments as second nodes, the group of comments corresponding to comments authored by the group of users; one or more instructions to form first edges from the first nodes to the second nodes based on first relationships between the first nodes and the second nodes; one or more instructions to form second edges from the second nodes to the first nodes based on the first relationships, and one or more instructions to form third edges from first nodes to other first nodes based on relationships between the first nodes and the other first nodes. The computer-readable medium may further include one or more instructions to assign initial values to the first nodes and the second nodes; one or more instructions to run iterations of a graph algorithm to obtain ranking scores, the iterations being run until values of the first nodes and the second nodes converge or until a number of iterations has been performed, where the ranking score of each of the first nodes reflects a reputation of the corresponding user, and where the ranking score of each of the second nodes reflects an indication of quality of the corresponding comment; and one or more instructions to provide at least one of a list of users that is ordered based on the ranking scores of the first nodes, or a ranked list of comments, the comments in the ranked list being ordered based on the ranking scores of the comments in the ranked list.

In still a further implementation, a method may be performed by one or more server devices. The method may include calculating, using a processor of the one or more server devices, first initial values for a group of comments based on signals particular to the group of comments; calculating, using a processor of the one or more server devices and for each user of a group of users, a second initial value, the second initial value being based on signals particular to the user, a quantity of comments, of the group of comments, that the user authored, and the first initial values for the comments that the user authored; representing, using a processor of the one or more server devices, the group of users as first nodes; and forming, using a processor of the one or more server devices, edges from one or more first nodes to one or more other first nodes based on relationships between the one or more first nodes and the one or more other first nodes. The method may further include assigning, using a processor of the one or more server devices, the second initial values to the first nodes; running, using a processor of the one or more server devices, iterations of a graph algorithm to obtain ranking scores for the first nodes, the running iterations occurring until values of the first nodes converge or until a number of iterations has been performed, where the running iterations causes a portion of the second initial values of the one or more first nodes to be transferred to the one or more other first nodes based on the formed edges; and providing, using a processor of the one or more server devices, a ranked list of users using the converged values.

In another implementation, a method may be performed by one or more server devices. The method may include calculating, using a processor of the one or more server devices, first ranking scores for a group of users and second ranking scores for a group of comments authored by the group of users, the calculating occurring during a same process and including conveying, using a processor of the one or more server devices, a reputation of one user, of the group of users, to another user, of the group of users, based on the one user subscribing to the other user. The method may further include providing, using a processor of the one or more server devices, one of a first ranked list that includes information identifying the group of users, the list being ordered based on the first ranking scores, or a first group of comments of the group of comments, the comments in the first group of comments being ordered based on the second ranking scores.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 17 is a diagram of an exemplary graphical user interface that may be provided in connection with the process of FIG. 16.

DETAILED DESCRIPTION

The following detailed description refers to the accompanying drawings. The same reference numbers in different drawings may identify the same or similar elements.

Overview

For some documents, users might like to see comments regarding these documents. A "comment," as used herein, may include text, audio data, video data, and/or image data that provides an opinion of, or otherwise remarks upon, the contents of a document or a portion of a document. One example of a comment may include a document whose sole purpose is to contain the opinion/remark. Another example of a comment may include a blog post. Yet another example of a comment may include a web page or a news article that remarks upon an item (e.g., a product, a service, a company, a web site, a person, a geographic location, or something else that can be remarked upon). A further example of a comment may include a comment that includes a remark/opinion regarding another comment.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.).

Figure 1:
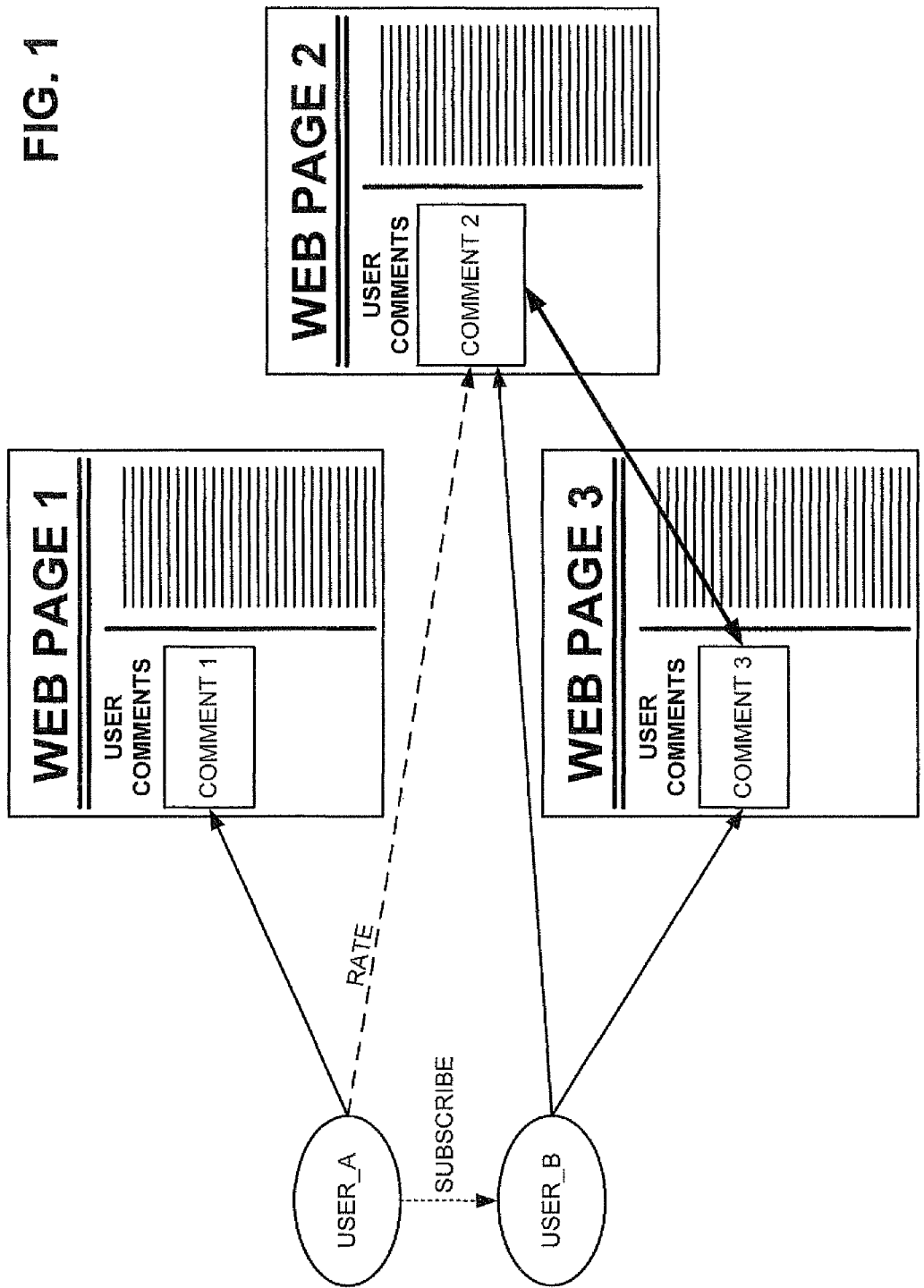
FIG. 1 is a diagram illustrating an overview of an exemplary implementation described herein.

FIG. 1 is a diagram illustrating an overview of an exemplary implementation described herein. As shown in FIG. 1, assume that a web page provides information about a particular topic (shown as "web page 1" in FIG. 1). A user (shown as "user_A" in FIG. 1) may decide to provide a comment regarding web page 1. In this case, the user may activate a commenting feature to provide the comment (e.g., shown as "comment 1"). The user may then provide, for example, an opinion or remark as the content of the comment. In addition, assume that another user (shown as "user_B" in FIG. 1) provides comments (shown as "comment 2" and "comment 3" in FIG. 1) on two separate web pages (shown as "web page 2" and "web page 3" in FIG. 1). The comments may be stored in a database in association with the web pages.

In addition to providing comments, users may rate comments authored by other users. For example, as shown by the dotted line in FIG. 1, user_A has rated comment 2. The rating may include a positive indication (e.g., that user_A found the comment helpful, agreed with the comment, liked the comment, etc.) or a negative indication (e.g., that user_A found the comment unhelpful, disagreed with the comment, disliked the comment, etc.).

Users may also subscribe to comments submitted by other users. For example, a particular user may subscribe to comments submitted by another user based on a relationship between the user and the other user. For example, the relationship may be a "friend" relationship, a relationship that could be inferred from user logs (e.g., that a user and an author have a common interest, that a user tends to like comments from an author), etc. Thus, the user may subscribe to receive an indication whenever the other user submits a comment. As indicated in FIG. 1, user_A has subscribed to receive indications when user_B submits comments, as depicted the dotted line from user_A to user_B.

In some instances, one comment may be associated with another comment based on a relationship between the two comments. For example, one comment may be associated with another comment based on the similarity of the content of the one comment and the other comment and/or based on the similarity of the content of the web pages with which the comments are associated. Comments may additionally or alternatively be associated based on other types of relationships. As indicated in FIG. 1, a relationship has been determined to exist between comment 2 and comment 3.

In one implementation, ranking scores may be determined for the users and the comments simultaneously and during the same process. During this process, all or a portion of the ranking scores for users may be transferred to those comments that the users have created or for which the users have submitted ratings. In addition, all or a portion of the ranking scores for the comments may be transferred to the users who have created the comments. Still further, all or a portion of the ranking score for a user may be transferred to those users to which the user has subscribed. And yet still further, all or a portion of the ranking score for a comment may be transferred to another comment based on a relationship between the two comments. In this way, reputations of the users may be considered in determining the ranking score of comments and other users, and the quality of comments may be considered in determining the ranking score of users and other comments.

Exemplary Environment

Figure 2:
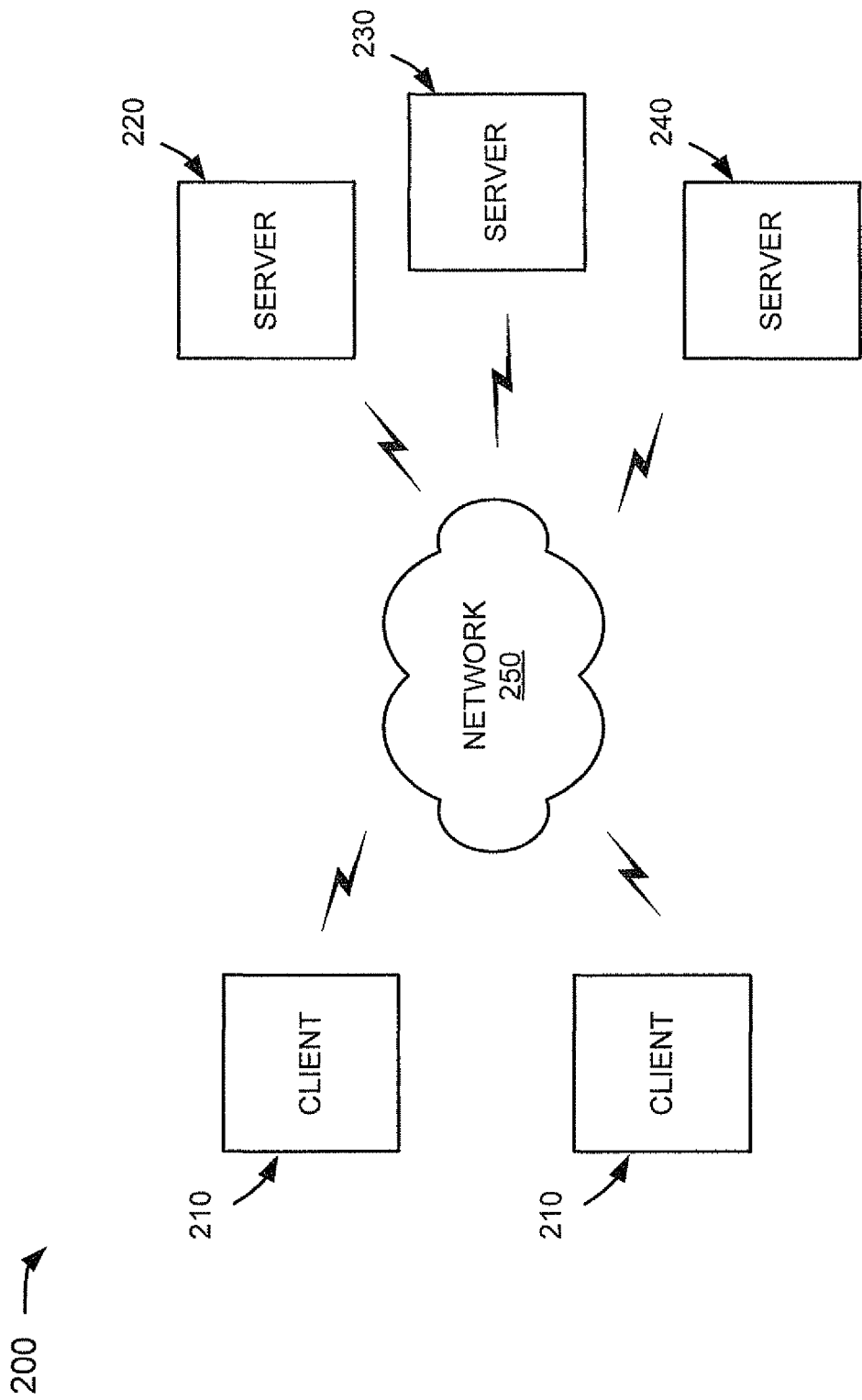
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device; a thread or process running on one of these devices; and/or an object being executed by one of these devices. In one implementation, a client 210 may include a browser application that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

In one implementation, as described herein, the browser may provide a commenting function. The commenting function may permit a user to generate a comment regarding a document, permit the user to view a comment that was previously generated by the user or by other users, and/or permit the user to rate a previously-generated comment, and/or permit the user to subscribe to comments of other users.

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Components of Client and/or Server

Figure 3:
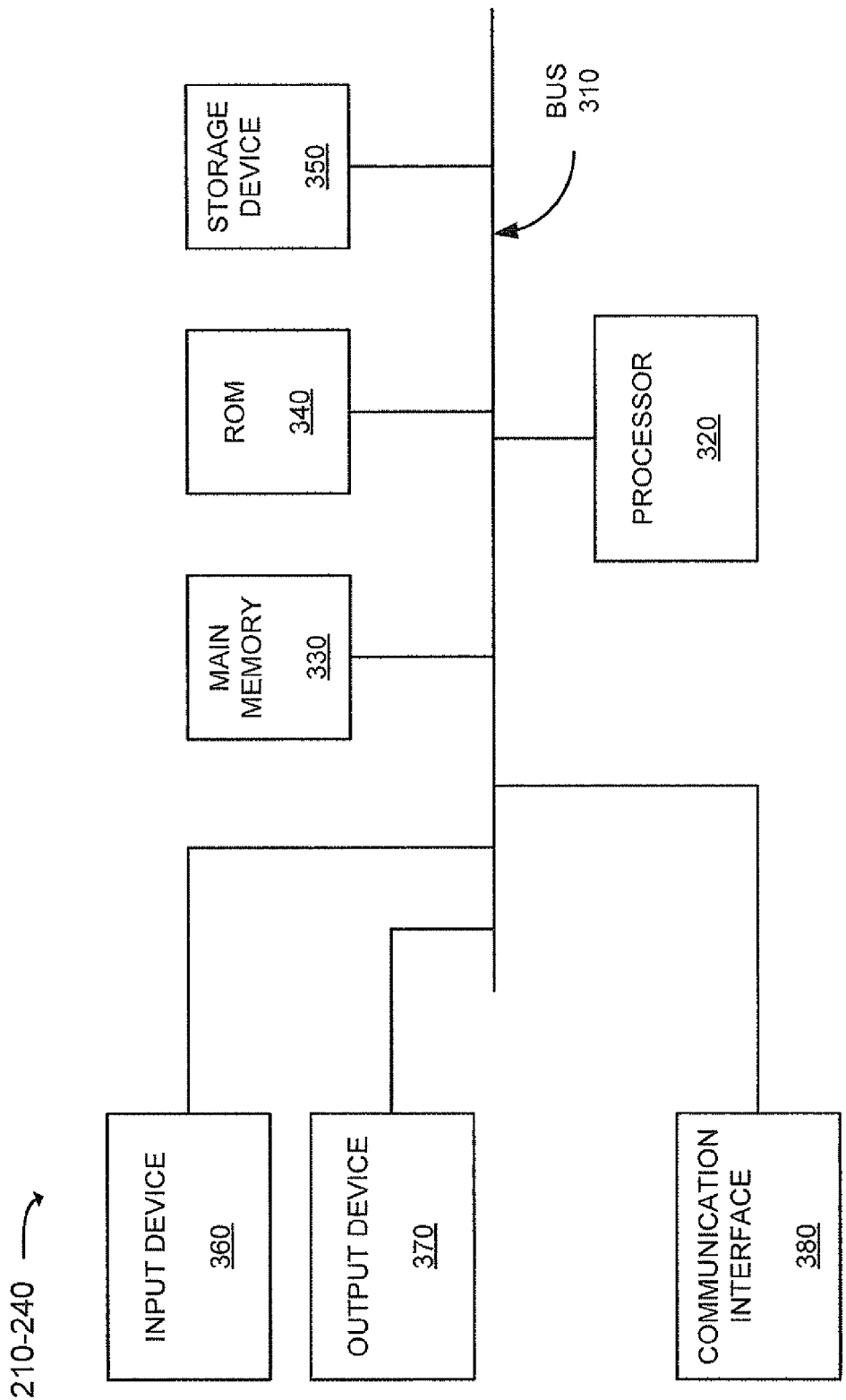
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. As shown in FIG. 3, the client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain operations relating to determining the reputations of users and measures of the quality of comments. The client/server entity may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Functional Components of Server

Figure 4:
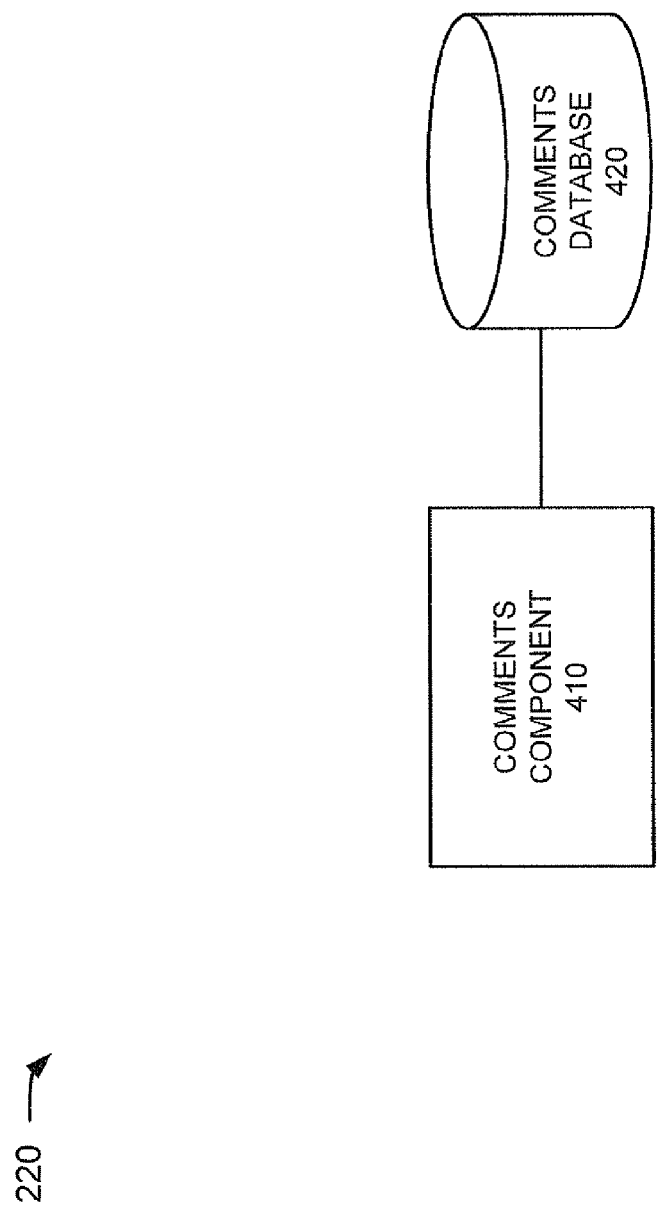
FIG. 4 is a diagram of exemplary functional components of a server of FIG. 2.

FIG. 4 is a diagram of exemplary functional components of server 220. As shown in FIG. 4, server 220 may include a comments component 410 and a comments database 420. In another implementation, server 220 may include more or fewer functional components. For example, one or more of the functional components shown in FIG. 4 may be located in a device separate from server 220.

Comments component 410 may interact with clients 210 to obtain and/or serve comments. For example, a user of a client 210 may access a particular document and generate a comment regarding the document. The document may include text, an image, a video, or some other form of media. Client 210 may send the comment and information regarding the document to comments component 410.

Comments component 410 may receive the comment provided by a client 210 in connection with the particular document. Comments component 410 may gather certain information regarding the comment, such as information regarding the author of the comment, a timestamp that indicates a date and/or time at which comment was created, the content of the comment, and/or an address (e.g., a URL) associated with the document. Comments component 410 may receive at least some of this information from client 210. Comments component 410 may store the information regarding the comment in comments database 420.

Comments component 410 may also serve a comment in connection with a document accessed by a client 210. In one implementation, comments component 410 may obtain a comment from comments database 420 and provide that comment to client 210 when client 210 accesses a document with which that comment is associated in comments database 420.

Comments component 410 may also receive ratings for comments served by comments component 410. When a comment is presented to a user in connection with presentation of a particular document, the user may be given the opportunity to provide explicit feedback on that comment. For example, the user may indicate whether the comment is meaningful (e.g., a positive vote) or not meaningful (e.g., a negative vote) to the user (with respect to the particular document) by selecting an appropriate voting button. This user feedback (positive or negative) may be considered a rating for the comment by the user. The rating may be a simple positive or negative indication, as described above, or may represent a degree of like/dislike for a comment (e.g., the rating may be represented as a scale from, for example, 1 to 5). Client 210 may send the rating and other information, such as information identifying the particular comment on which the rating is provided, information identifying the user, etc. to comments component 410. Comments component 410 may store the ratings in comments database 420 in association with information identifying the users that submitted the ratings and the comments for which the ratings were submitted.

Comments component 410 may further allow a user to subscribe to receive an indication when another user submits a comment. This type of subscription is referred to as the user subscribing to the other user (also referred to as subscribing to the comments of the other user). In one implementation, comments component 410 may provide a graphical user interface to the user that allows the user to indicate a desire to subscribe to the other user. For example, the indication may be a result of the user selecting a link, a button, a menu item, etc. Comments component 410 may store information identifying the subscription in a database, such as comments database 420 or a user profile database (not shown).

Comments database 420 may store information regarding comments. In one implementation, comments database 420 may include various fields that are separately searchable. Comments component 410 may search comments database 420 to identify comments associated with a particular author, a particular rater, or a particular document.

Figure 5:
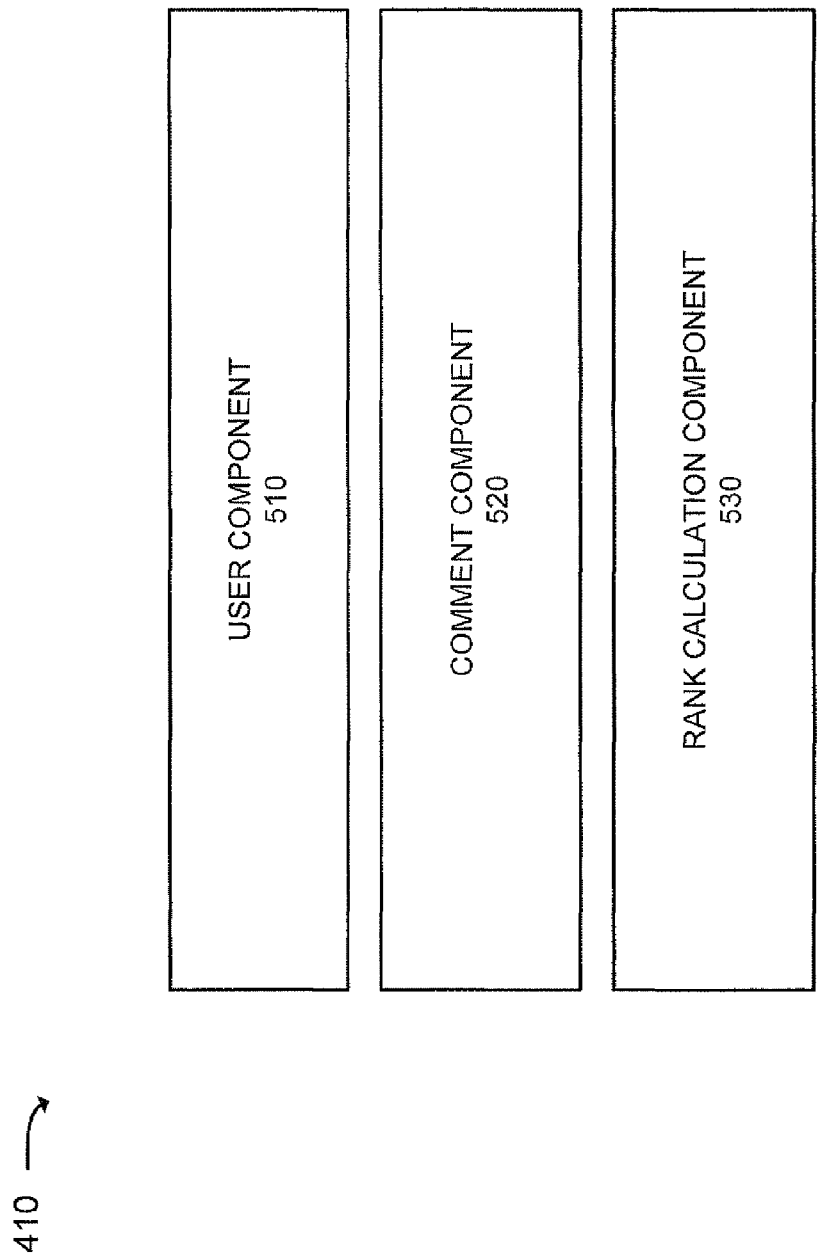
FIG. 5 is a diagram of exemplary functional components of the comments component of FIG. 4.

FIG. 5 is a diagram of functional components of comments component 410 of FIG. 4. As shown in FIG. 5, comments component 410 may include a user component 510, a comment component 520, and a rank calculation component 530. In another implementation, comments component 410 may include more or fewer functional components. For example, one or more of the functional components shown in FIG. 5 may be located in a device separate from server 220 or may be associated with a different functional component of server 220.

User component 510 may receive signals associated with a user of a comment and calculate an initial user score for the user based on the signals. In one implementation, user component 510 may calculate an initial user score for a user based on, for example, the length of time that the user has been a user of the system (e.g., the commenting system) or registered with the system (e.g., with the assumption that the longer that a user has been a user of the system (or registered with the system), the more trustworthy the user is). User component 510 may further calculate the initial user score based on additional or different signals relating to the user. For example, the age of the user, if known, may be used in the initial user score calculation (e.g., with the assumption, for example, that users in a certain age range may provide better comments than users with ages outside of the age range). As another example, the educational background of the user, if known, may be used in the initial user score calculation (e.g., with the assumption, for example, that the users with high levels of education may provide better comments than users with lower levels of education). When multiple signals are used in calculating the initial user score, user component 510 may weigh some of the signals more heavily than other signals.

Comment component 520 may receive signals associated with a comment and calculate an initial score for the comment based on the signals. In one implementation, comment component 520 may calculate an initial comment score for a comment based on the length of the comment. In this situation, longer comments (e.g., comments containing more than a threshold number of words) may be considered to be better comments than comments containing a fewer number of words. Comment component 520 may alternatively or additionally consider a language model of the comment. For example, the closer the language of a comment is to Standard English (or some other language), the better the comment may be considered to be. Other signals may alternatively or additionally be used. When multiple signals are used in calculating the initial comment score, comment component 520 may weigh some of the signals more heavily than other signals.

Rank calculation component 530 may combine the initial user scores and the initial comment scores to calculate user ranking scores and comment ranking scores. The user ranking scores may reflect reputations of the corresponding users. For example, a higher ranking score may reflect that a user has a better reputation as an author (and/or rater) over another user with a lower ranking score. The comment ranking scores may represent the quality of the corresponding comments.

In one implementation, rank calculation component 540 may calculate the user ranking scores and comment ranking scores based on a graph. For example, rank calculation component 530 may represent users and comments as nodes. Rank calculation component 530 may further represent relationships between these nodes as edges (or links). For example, an edge may be present between a first node that represents a user and a second node that represents the comment that the user authored. Thus, user nodes may be linked to the comment nodes, representing the comments that the users authored, and the comment nodes may be linked to the user nodes, that represent the users who authored the comments. In this way, reputations of user nodes may be passed to comment nodes and measures of quality of comment nodes may be passed to user nodes. Additionally, an edge may be present between a first node that represents a user acting in a rater capacity and a second node that represents the comment for which the user has submitted a rating. Thus, user nodes may be linked to the comment nodes, representing the comments that the users rated, and the comment nodes may be linked to the user nodes, that represent the users who submitted the ratings. In this way, reputations of user nodes may be passed to comment nodes and measures of quality of comment nodes to be passed to user nodes. Additionally, an edge may be present between a first node that represents a user and a second node that represents another user. For example, as indicated above, a first user may subscribe to a second user so as to receive indications when the second user submits comments. Thus, an edge may be present from the node representing the first user to the node representing the second user. As an example, referring back to FIG. 1, the node representing user_A may be linked to the node representing user_B. Additionally, an edge may be present between a first comment and a second comment. For example, as indicated above, a first comment may be associated with a second comment based on a relationship between the first comment and the second comment. For example, an edge may be present between a first node that represents a first comment and a second node that represents a second comment for which a relationship with the first comment has been determined. Thus, the first comment node may be linked to the second comment node, and the second comment node may be linked to the first comment node. In this way, measures of quality of comment nodes may be passed to other comment nodes.

Once the nodes and edges have been represented, ranking calculation component 530 may calculate ranking scores for the nodes. In one implementation, rank calculation component 530 may use an algorithm similar to the PageRank™ algorithm to calculate the ranking scores for the nodes. Thus, for example, rank calculation component 530 may assign the initial scores calculated by user component 510 to the nodes representing users and the initial scores calculated by comment component 520 to the nodes representing comments. Rank calculation component 530 may run iterations of the graph algorithm (where all or a portion of the initial scores of the nodes are conveyed to nodes to which the node links) until the ranking scores converge. In another implementation, rank calculation component 530 may run iterations of the graph algorithm until a number of iterations (e.g., a threshold number) have been performed. In still another implementation, rank calculation component 530 may run iterations of the graph algorithm until either the ranking scores converge or until the number of iterations has been performed. It will be appreciated that rank calculation component 530 may use one or more other algorithms to calculate user ranking scores and comment ranking scores or simply take the initial scores calculated by user component 510 and comment component 520 as the ranking scores. Once calculated, rank calculation component 530 may store the ranking scores in a database.

Figure 6:
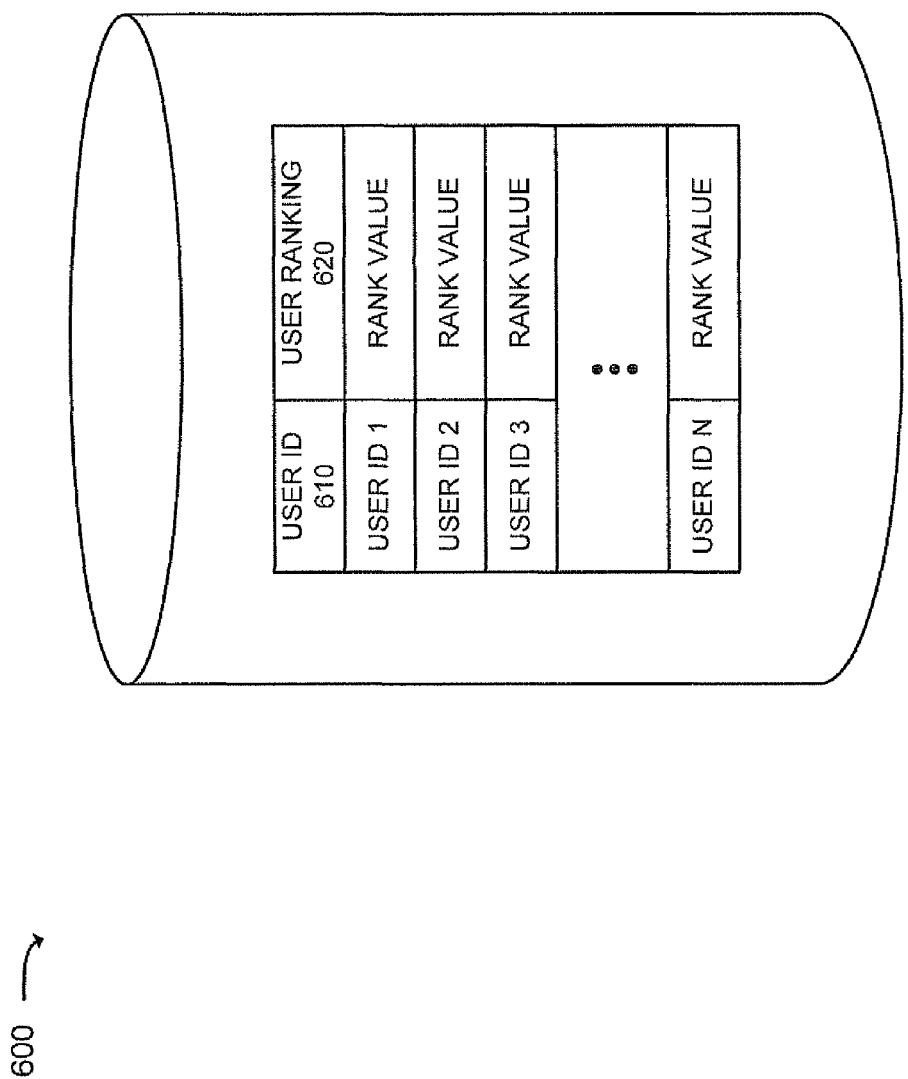
FIGS. 6 and 7 are diagrams of exemplary databases that may be associated with the comments component of FIG. 4.

FIG. 6 is a diagram of a first exemplary database 600 that may be associated with comments component 410 of FIG. 4. While one database is described below, it will be appreciated that database 600 may include multiple databases stored locally at server 220 (e.g., in comments database 420), or stored at one or more different and/or possibly remote locations.

As illustrated, database 600 may include a group of entries with the following exemplary fields: a user identifier (ID) field 610 and a user ranking field 620. Database 600 may contain additional fields (not shown) that aid comment component 410 in providing information relating to users.

User identifier field 610 may store information that identifies a user. For example, user identifier field 610 may store a sequence of characters that uniquely identifies a user. In one implementation, the sequence of characters may correspond to a user name, an e-mail address, or some other type of identification information. User ranking field 620 may store a value representing the user ranking score (e.g., as calculated by rank calculation component 530) for the particular user, identified in user identifier field 610. As indicated above, the ranking score may represent a reputation of the user.

Figure 7:
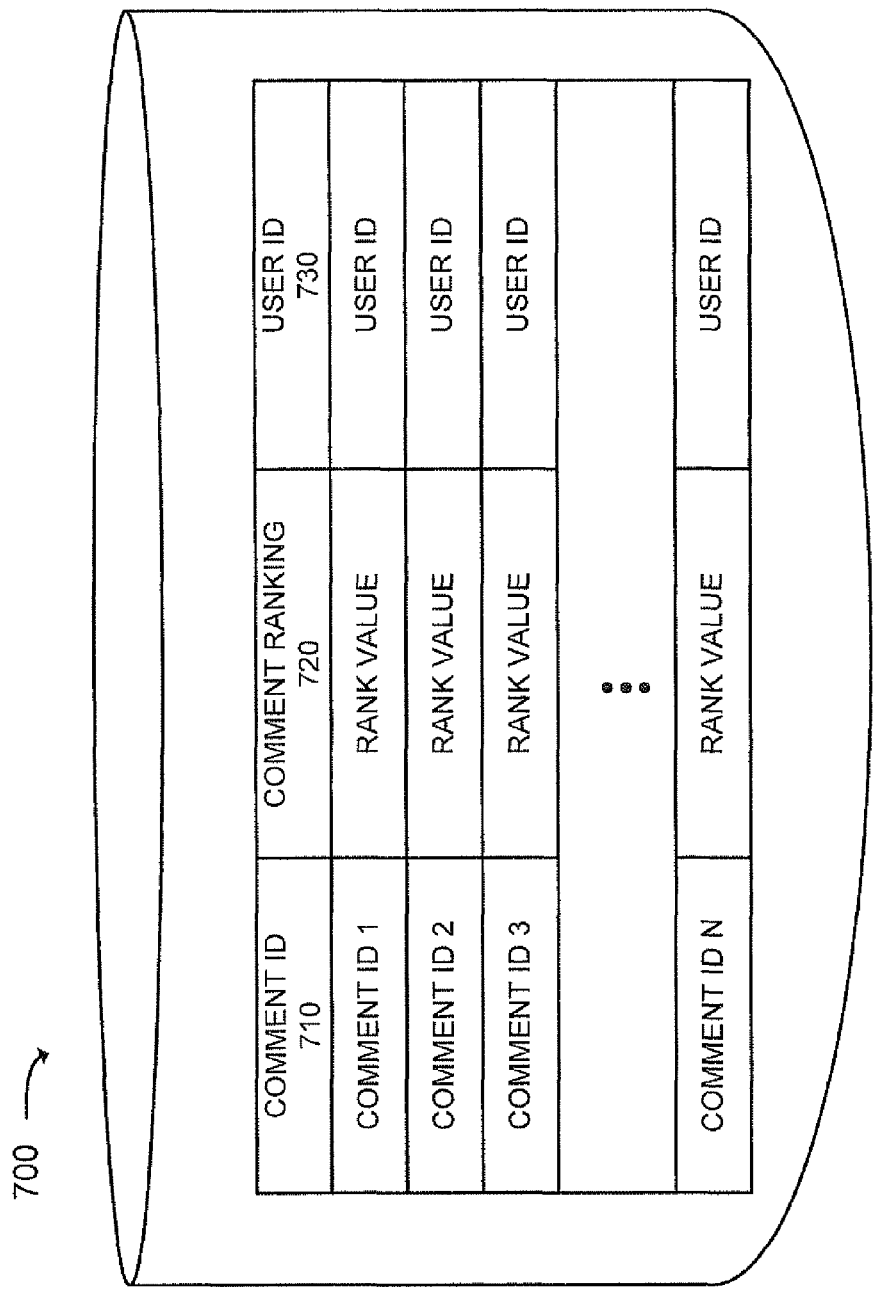

FIG. 7 is a diagram of a second exemplary database 700 that may be associated with comments component 410 of FIG. 4. While one database is described below, it will be appreciated that database 700 may include multiple databases stored locally at server 220 (e.g., in comments database 420), or stored at one or more different and/or possibly remote locations.

As illustrated, database 700 may include a group of entries with the following exemplary fields: a comment identifier field 710, a comment ranking field 720, and a user identifier field 730. Database 700 may contain additional fields (not shown) that aid comment component 410 in providing information relating to comments.

Comment identifier field 710 may store information that identifies a comment. For example, comment identifier field 710 may store a sequence of characters that uniquely identifies a comment. Comment ranking field 720 may store a value representing the comment ranking score (e.g., as calculated by rank calculation component 530) for the particular comment identified in comment identifier field 710. User identifier field 730 may store an identifier corresponding to the user who authored the comment identified in comment identifier field 710. The identifiers stored in user identifier field 730 may correspond to the user identifiers stored in database 600.

Calculating Initial User Scores

Figure 8:
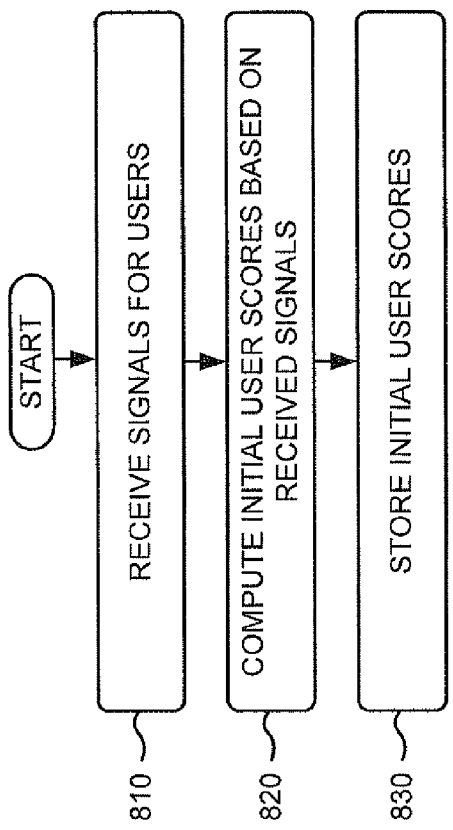
FIG. 8 is a flowchart of an exemplary process for determining initial user scores.

FIG. 8 is a flowchart of an exemplary process for determining initial user scores. In one implementation, the process of FIG. 8 may be performed by one or more components within server 220, client 210, or a combination of client 210 and server 220. In another implementation, the process may be performed by one or more components within another device or a group of devices separate from or including client 210 and/or server 220. Also, while FIG. 8 shows blocks in a particular order, the actual order may differ. For example, some blocks may be performed in parallel or in a different order than shown in FIG. 8.

The process of FIG. 8 may include receiving signals for users (block 810). The signals may include any information that may be used to determine initial scores for the users that reflect an initial level of reputation of the users. For example, the signals for a particular user may include the length of time that the user has been a user of the system (e.g., the commenting system) or registered with the system. With respect to these signals, when a user has been a user of the system for more than some period of time (or has been registered with the system for more than some period of time), the user may be given a higher (i.e., better) score than another user who has been a user of the system for less than the period of time. In addition or alternatively, the signals may include an age of the user. With respect to these signals, a user whose age is in a certain range (e.g., between the ages of 30 years old to 65 years old) may be given a higher (i.e., better) score than another user whose age is outside of the range. In addition or alternatively, the signals may include an educational background of the user. With respect to these signals, a user with a higher educational background may be given a higher (i.e., better) score than another user having a lower educational background. Other types of signals may additionally or alternatively be used. For example, the signals may further indicate the quantity of comments submitted by the user. With respect to these signals, a user who submits a quantity of comments that is above a threshold may be given a higher score than another user who submits a quantity of comments that is below the threshold.

The process may further include computing initial user scores based on the received signals (block 820). For example, user component 510 may calculate scores for each of the different user signals received and may combine the scores to obtain the initial user scores. As a very simple example, assume that user component 510 assigns a score to a user based the length of time that the user has been a user of the system. For example, if the user has been a user of the system for a very short amount of time (not greater than a first threshold), the user may be assigned a lowest (or worst) score. If the user has been a user of the system for more than the very short amount of time (greater than the first threshold), but less than a second, longer amount of time (not greater than a second threshold), the user may be assigned a medium score. In addition, if the user has been a user of the system for more than the second, longer amount of time (greater than the second threshold), the user may be assigned a highest (or best) score.

Once scores for the different signals are calculated, user component 510 may combine the scores to obtain the initial scores for the users. In one implementation, user component 510 may, for each individual user, add the individual scores for the individual user to obtain an initial user score for the user. User component 510 may, in some implementations, weigh the score associated with one of the signals more heavily than the score associated with another one of the signals. Other manners of combining the scores to obtain the initial user scores may alternatively be used.

The process may further include storing the initial user scores (block 830). For example, user component 510 may store the initial user scores in a database, such as database 600. In one implementation, user component 510 may store the initial user scores in field 620 in the appropriate rows of database 600.

Calculating Initial Comment Scores

Figure 9:
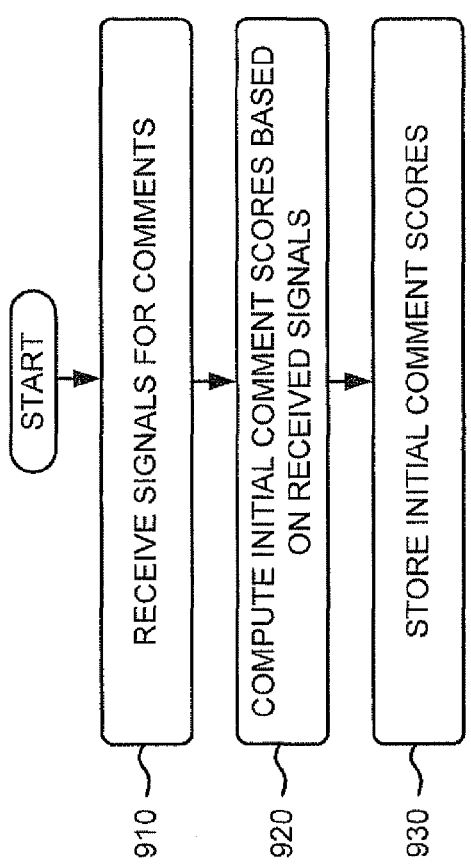
FIG. 9 is a flowchart of an exemplary process for determining initial comment scores.

FIG. 9 is a flowchart of an exemplary process for determining initial comment scores. In one implementation, the process of FIG. 9 may be performed by one or more components within server 220, client 210, or a combination of client 210 and server 220. In another implementation, the process may be performed by one or more components within another device or a group of devices separate from or including client 210 and/or server 220. Also, while FIG. 9 shows blocks in a particular order, the actual order may differ. For example, some blocks may be performed in parallel or in a different order than shown in FIG. 9.

The process of FIG. 9 may include receiving signals for comments (block 910). The signals may include any information that may be used to determine initial scores for the comments that reflect a measure of quality of the comments. For example, the signals for a particular comment may include the length of the comment. In this situation, a first comment that contains a threshold number of terms, or more than the threshold number, may be assigned a higher (or better) score than another comment containing less than the threshold number of terms. In addition or alternatively, the signals may include information identifying how closely the language used in a particular comment matches a particular language model. With respect to these signals, a comment whose language more closely matches Standard English, for example, may be assigned a higher (or better) score than another comment whose language does not closely match Standard English (e.g., comments using slang or abbreviations). Other types of signals may alternatively be used.

The process may further include computing initial comment scores based on the received signals (block 920). For example, comment component 520 may calculate scores for each of the different signals received and may combine the scores to obtain the initial comment scores. Once scores for the different signals are calculated, comment component 520 may combine the scores to obtain the initial scores for the comments. In one implementation, comment component 520 may add the individual scores for the individual comments to obtain an initial comment score for each individual comment. Comment component 520 may, in some implementations, weigh the score from one of the signals more heavily than the score from another one of the signals. Other manners of combining the scores to obtain the initial comment scores may alternatively be used.

The process may further include storing the initial comment scores (block 930). For example, comment component 520 may store the initial comment scores in a database, such as database 700. In one implementation, comment component 520 may store the initial comment scores in field 720 in the appropriate rows of database 700.

Calculating User and Comment Ranking Scores

Figure 10:
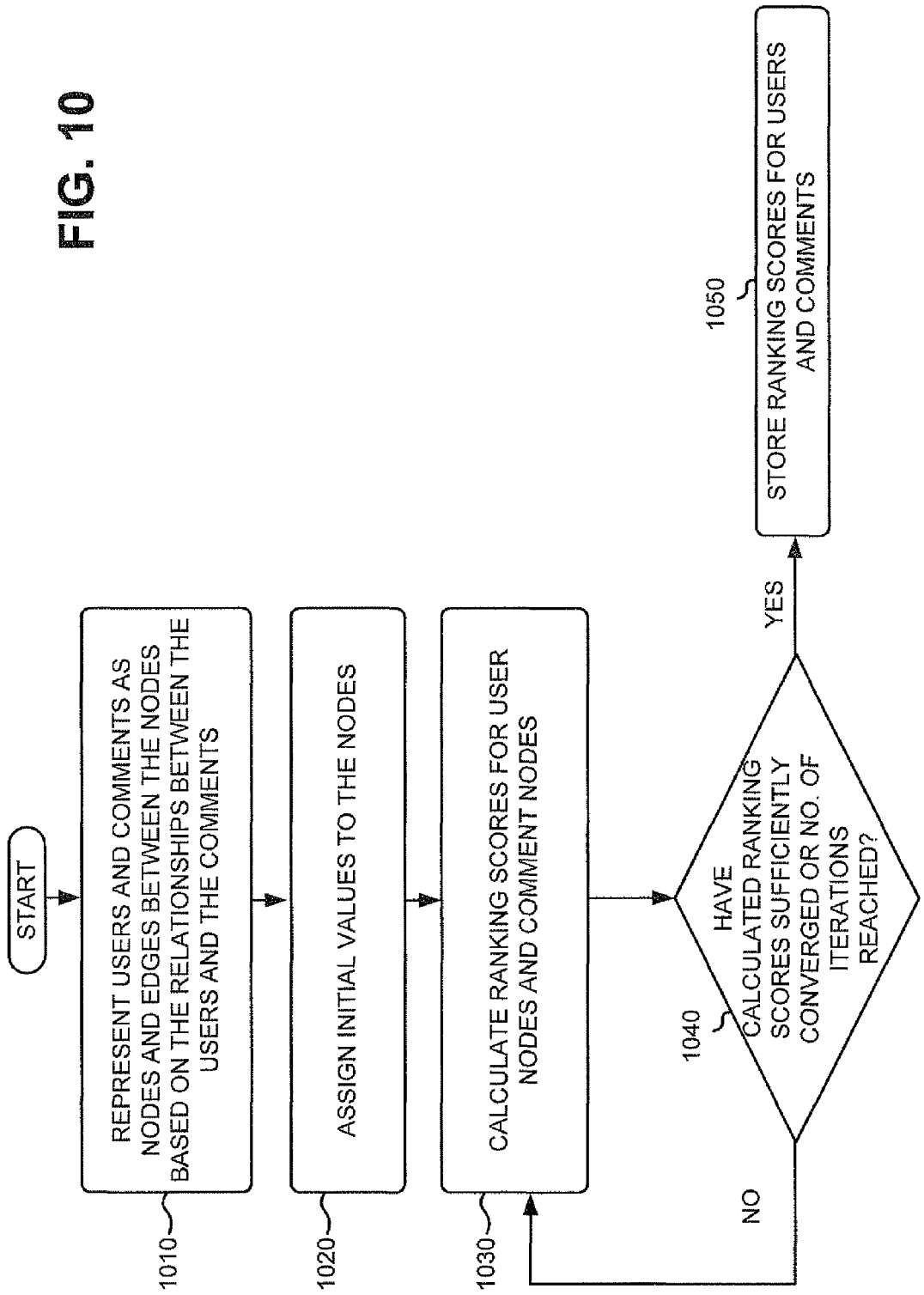
FIG. 10 is a flowchart of an exemplary process for determining ranking scores for users and comments.

FIG. 10 is a flowchart of an exemplary process for determining ranking scores for users and comments. In one implementation, the process of FIG. 10 may be performed by one or more components within server 220, client 210, or a combination of client 210 and server 220. In another implementation, the process may be performed by one or more components within another device or a group of devices separate from or including client 210 and/or server 220. Also, while FIG. 10 shows blocks in a particular order, the actual order may differ. For example, some blocks may be performed in parallel or in a different order than shown in FIG. 10.

The process of FIG. 10 may include representing the users and comments as nodes (block 1010). For example, in one implementation, rank calculation component 530 may retrieve information identifying each user and each comment from databases 600 and 700, respectively, and may represent each user and each comment as a different node in a graph. The process may further include representing relationships between users and comments as edges (block 1010). For example, rank calculation component 530 may provide an edge from a first node that represents a user to a second node that represents the comment that the user authored. Thus, user nodes may be linked to the comment nodes that the users authored. Similarly, rank calculation component 530 may provide an edge from a first node that represents a comment to a second node that represents the user who authored the comment. Thus, comment nodes may be linked to the user nodes, representing the users who authored the comments. Additionally, rank calculation component 530 may provide an edge from a first node that represents a user to a second node that represents the comment for which the user has submitted a rating. Thus, user nodes may be linked to the comment nodes for which the users have submitted ratings. Similarly, rank calculation component 530 may provide an edge from a first node that represents a comment to a second node that represents the user who rated the comment. Thus, comment nodes may be linked to the user nodes, representing the users who rated the comments. Additionally, rank calculation component 530 may provide an edge from a first node that represents a first user to a second node that represents a second user to which the first user has subscribed. In this way, a user's reputation can influence another user's reputation. Similarly, rank calculation component 530 may provide edges between a first node that represents a first comment to a second node that represents a second comment. Thus, comment nodes may be linked to other comment nodes. It will be appreciated that the edges described above are exemplary and that in some embodiments, additional or fewer edges may be provided.

Figure 11:
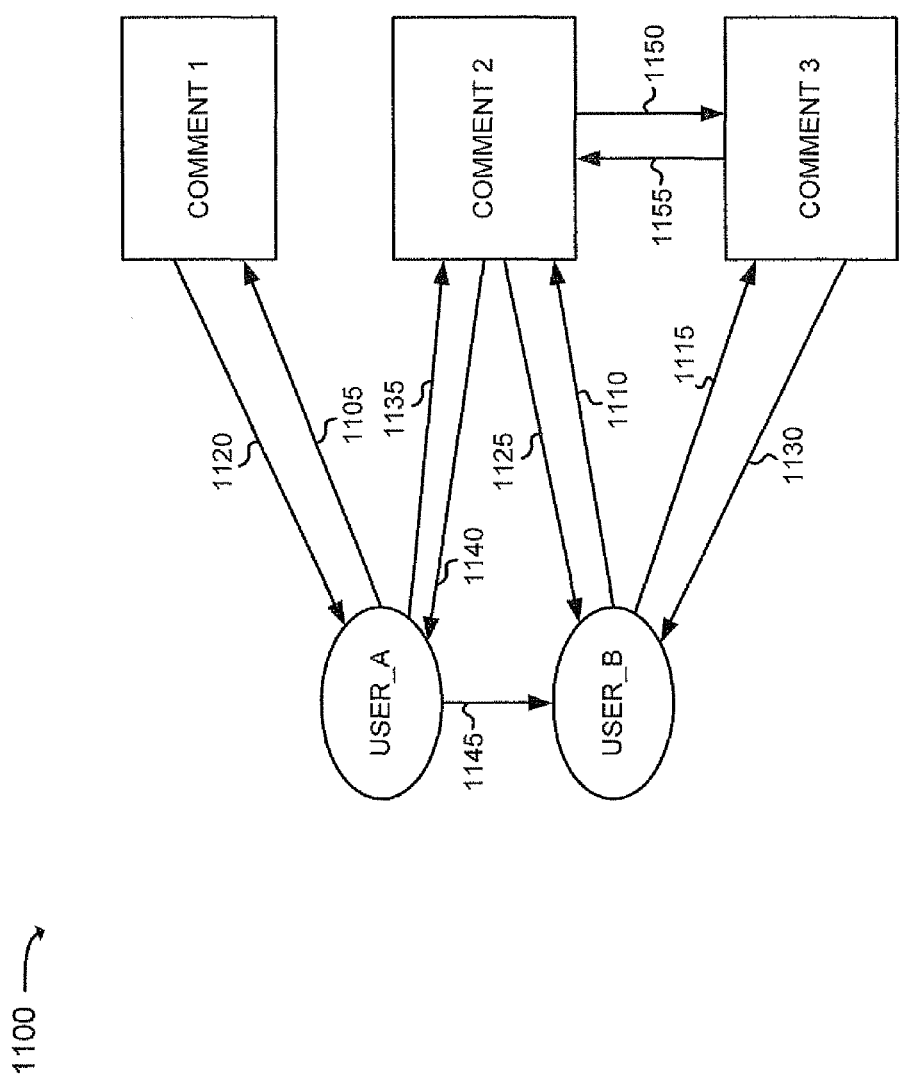
FIG. 11 is a diagram of an exemplary graph that may be used for determining ranking scores for users and comments in the exemplary process of FIG. 10.

FIG. 11 is a diagram of an exemplary graph 1100 that may be used for determining ranking scores for users and comments in the exemplary process of FIG. 10. In FIG. 11, the users and comments described above with respect to FIG. 1 are represented as nodes in graph 1100. Edges may be formed from the users to the comments that the users authored. For example, an edge 1105 may be formed from user_A to comment 1, an edge 1110 may be formed from user_B to comment 2, and an edge 1115 may be formed from user_B to comment 3. Edges may also be formed from comments to the users who authored the comments. For example, an edge 1120 may be formed from comment 1 to user_A, an edge 1125 may be formed from comment 2 to user_B, and an edge 1130 may be formed from comment 3 to user_B. Edges may further be formed from users to comments that the users have rated. For example, an edge 1135 may be formed from user_A to comment 2. Edges may also be formed from comments to the users who rated the comments. For example, an edge 1140 may be formed from comment 2 to user_A. Edges may also be formed from first users to second users to which the first users have subscribed. For example, an edge 1145 may be formed from user_A to user_B. Edges may also be formed between comments based on a relationship of the comments. For example, an edge 1150 may be formed from comment 2 to comment 3, and an edge 1155 may be formed from comment 3 to comment 2.

Returning to FIG. 10, the process may further include assigning initial values to the nodes in the graph (block 1020). For example, rank calculation component 530 may assign the initial user scores (e.g., as calculated above with respect to FIG. 8) to the appropriate user nodes. In addition, rank calculation component 530 may assign the initial comment scores (e.g., as calculated above with respect to FIG. 9) to the appropriate comment nodes.

The process may further include calculating ranking scores for all of the nodes in the graph (block 1030). In one implementation, rank calculation component 530 may use an algorithm similar to the PageRank™ algorithm to calculate the ranking scores for the nodes. Thus, for example, rank calculation component 530 may run iterations of the graph algorithm (where all or a portion of the initial scores of the nodes are conveyed to nodes to which the node links). Other techniques for calculating the ranking scores can alternatively be used.

The process may include determining whether the calculated ranking scores have sufficiently converged and/or whether a number of iterations (e.g., more than a threshold) have been performed (block 1040). If the calculated ranking scores have not sufficiently converged and the number of iterations has not been performed (block 1040—NO), then rank calculation component 530 may continue running iterations of the graph algorithm (block 1030). If, on the other hand, the calculated ranking scores have sufficiently converged or the number of iterations has been performed (block 1040—YES), the ranking scores may be stored (block 1050). For example, rank calculation component 530 may store the ranking scores in one or more databases, such as databases 600 and 700. In one implementation, the storage of the user ranking scores may act to replace the initial user scores in field 620 of database 600, and the storage of the comment ranking scores may act to replace the initial comment scores in field 720 of database 700.

In this way, the user ranking scores and the comment ranking scores may be simultaneously determined. Moreover, these different ranking scores may be determined in the same process.

Figure 12:
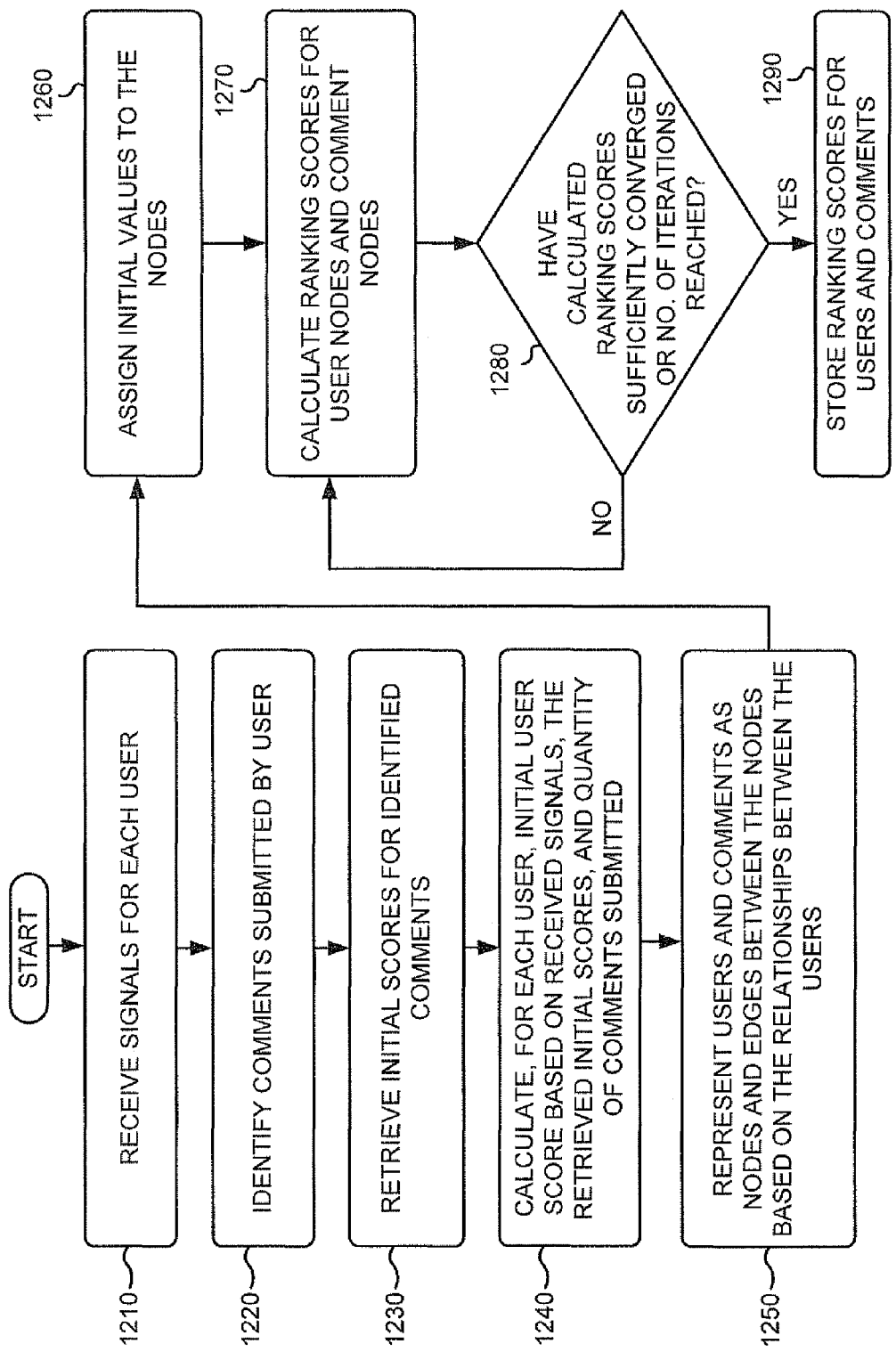
FIG. 12 is a flowchart of another exemplary process for determining ranking scores for users and comments.

Other techniques for calculating the user ranking scores and the comment ranking scores may alternatively be used. For example, FIG. 12 is a flowchart of another exemplary process for determining ranking scores for users and comments. In one implementation, the process of FIG. 12 may be performed by one or more components within server 220, client 210, or a combination of client 210 and server 220. In another implementation, the process may be performed by one or more components within another device or a group of devices separate from or including client 210 and/or server 220. Also, while FIG. 12 shows blocks in a particular order, the actual order may differ. For example, some blocks may be performed in parallel or in a different order than shown in FIG. 12.

The process of FIG. 12 may include receiving signals for each user of the users associated with the system (block 1210). The users may include, for example, those users identified in database 600. The signals may include any information that may be used to determine initial scores for the users that reflect an initial level of reputation of the users. For example, the signals may include the signals described above with respect to FIG. 10.

The process may further include identifying, for each user, comments submitted by the user (block 1220). For example, user component 510 may use the user's identifier to retrieve information identifying the comments that the user authored by searching database 700.

The process may further include retrieving initial scores for the identified comments (block 1230). For example, user component 510 may use the information identifying the comments to retrieve the initial scores for the identified comments from database 700.

The process may also include calculating, for each user, an initial user score based on the received signals, the retrieved initial comment scores, and the quantity of the comments submitted by the user (block 1240). For example, user component 510 may calculate scores for each of the different signals received, a score based on the retrieved initial comment scores, and the quantity of the comments submitted by the user. Once the scores are calculated, user component 510 may combine the scores to obtain the initial score for the user. In one implementation, user component 510 may, for each individual user, add the individual scores for the individual user to obtain an initial user score for the user. User component 510 may, in some implementations, weigh one score more heavily than another score. Other manners of combining the scores to obtain the initial user score may alternatively be used.

The process may include representing the users and comments as nodes (block 1250). For example, in one implementation, rank calculation component 530 may retrieve information identifying each user and each comment from databases 600 and 700, respectively, and may represent each user and each comment as a different node in a graph. Alternatively, only the users may be represented as nodes in the graph.

The process may further include representing relationships between users and comments as edges (block 1250). For example, rank calculation component 530 may provide an edge from a first node that represents a first user and a second node that represents a second user to which the first user has subscribed. In this way, a user's reputation can influence another user's reputation. In this implementation, however, rank calculation component 530 may not provide edges between user nodes and comment nodes since the measures of quality of the comments may be reflected in the initial user scores.

Figure 13:
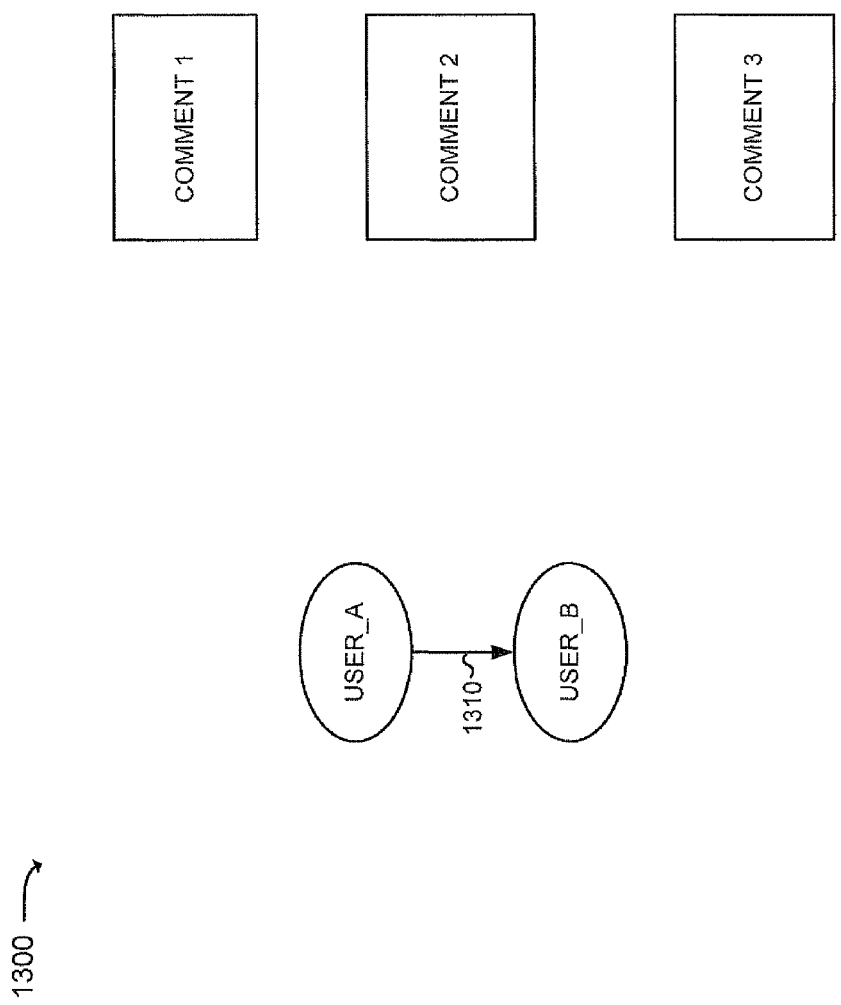
FIG. 13 is a diagram of an exemplary graph that may be used for determining ranking scores for users and comments in the exemplary process of FIG. 12.

FIG. 13 is a diagram of an exemplary graph 1300 that may be used for determining ranking scores for users and comments in the exemplary process of FIG. 12. In FIG. 13, the users and comments described above with respect to FIG. 1 are represented as nodes in graph 1300. In this implementation, edges may be formed from first users to second users to which the first users have subscribed. For example, an edge 1310 may be formed from user_A to user_B.

Returning to FIG. 12, the process may further include assigning initial values to the nodes in the graph (block 1260). For example, rank calculation component 530 may assign the initial user scores (e.g., as calculated above with respect to block 1240) to the appropriate user nodes. In addition, rank calculation component 530 may assign the initial comment scores (e.g., as calculated above with respect to FIG. 9) to the appropriate comment nodes.

The process may further include calculating ranking scores for all of the nodes in the graph (block 1270). In one implementation, rank calculation component 530 may use an algorithm similar to the PageRank™ algorithm to calculate the ranking scores for the nodes. Thus, for example, rank calculation component 530 may run iterations of the graph algorithm (where all or a portion of the initial scores of the nodes are conveyed to nodes to which the node links). Other techniques for calculating the ranking scores can alternatively be used.

The process may include determining whether the calculated ranking scores have sufficiently converged and/or whether a number of iterations has been performed (block 1280). If the calculated ranking scores have not sufficiently converged and a number of iterations has not been performed (block 1280—NO), then rank calculation component 530 may continue running iterations of the graph algorithm (block 1270). If, on the other hand, the calculated ranking scores have sufficiently converged or the number of iterations has been performed (block 1280—YES), the ranking scores may be stored (block 1290). For example, rank calculation component 530 may store the ranking scores in one or more databases, such as databases 600 and 700. In one implementation, the storage of the user ranking scores may act to replace the initial user scores in field 620 of database 600, and the storage of the comment ranking scores may act to replace the initial comment scores in field 720 of database 700.

Providing Comments

Figure 14:
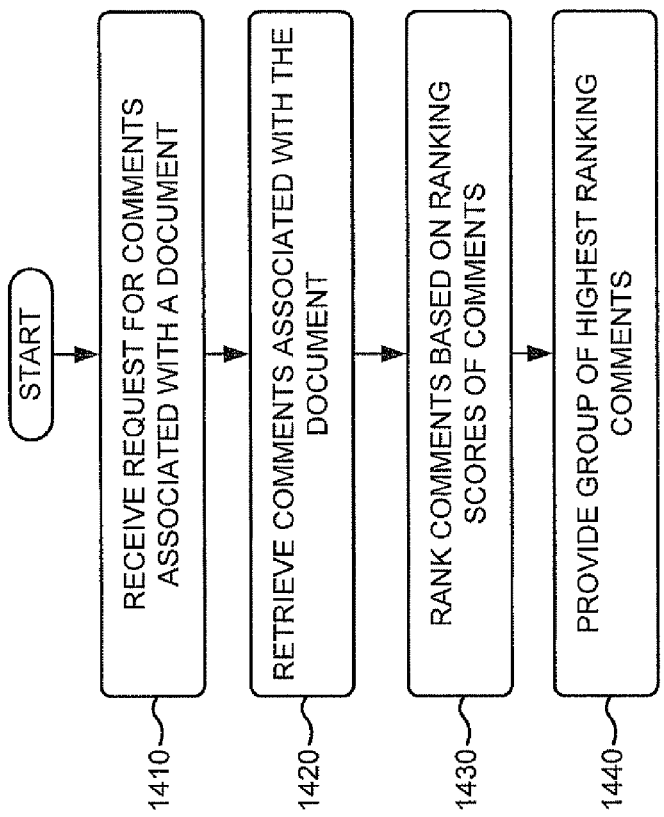
FIG. 14 is a flowchart of an exemplary process for providing a ranked list of comments.

FIG. 14 is a flowchart of an exemplary process for providing comments. In one implementation, the process of FIG. 14 may be performed by one or more components within server 220, client 210, or a combination of client 210 and server 220. In another implementation, the process may be performed by one or more components within another device or a group of devices separate from or including client 210 and/or server 220. Also, while FIG. 14 shows blocks in a particular order, the actual order may differ. For example, some blocks may be performed in parallel or in a different order than shown in FIG. 14.

The process of FIG. 14 may include receiving a request for comments associated with a document (block 1410). In one implementation, server 220 may receive the request from a client 210. The request may include information identifying the document, such as a uniform resource locator or another type of document identification information. In one implementation, the request may be submitted to server 220 in response to a command from a user of client 210 (e.g., in response to the user selecting a link or button on a provided graphical user interface, in response to the user selecting a menu item, etc.). Alternatively, the request may be submitted automatically whenever a user requests access to a document.

The process may further include retrieving comments associated with the document (block 1420). For example, comments component 410 may receive information identifying the document and may use this document identification information to retrieve comments associated with the document from a database, such as comments database 420.

The process may also include ranking the retrieved comments (block 1430). For example, comments component 410 may use information identifying the retrieved comments to retrieve the ranking scores that were calculated for the comments from, for example, database 700. Comments component 410 may rank the retrieved comments using the ranking scores.

The process may further include providing a group of the retrieved comments for presentation in connection with the document (block 1440). For example, in one implementation, a graphical user interface may be provided to the requesting device (e.g., client 210) that includes the document and the group of comments, or simply the group of comments. The group of comments may include all of the retrieved comments in, for example, a scrollable list, ordered based on the ranking performed in block 1430. Alternatively, the group of comments may include fewer than all of the retrieved comments. For example, a select number of the highest ranking comments may be provided in the graphical user interface.

Figure 15:
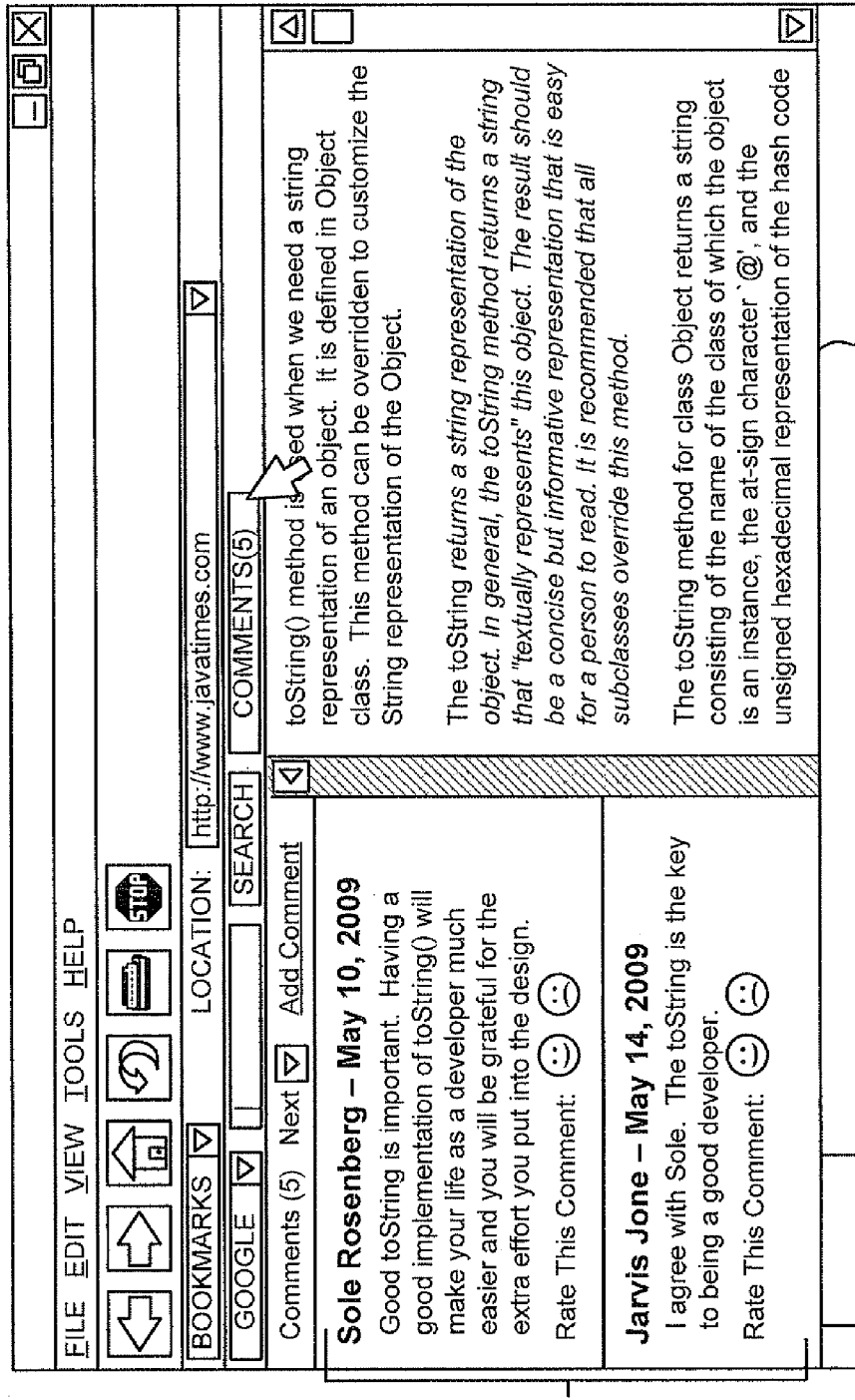
FIG. 15 is a diagram of an exemplary graphical user interface that may be provided in connection with the process of FIG. 14.

FIG. 15 is a diagram of an exemplary graphical user interface 1500 that may be provided to a user in connection with the process described in connection with FIG. 14. As illustrated, graphical user interface 1500 may include a first area 1510 that includes the requested document and a second area 1520 that includes the group of retrieved comments. In this example, the group of retrieved comments includes five comments. Moreover, the comment by Sole Rosenberg has the highest ranking score and the comment by Jarvis Jones has the second highest ranking score. Thus, comment component 510 provides the comment by Sole Rosenberg first and the comment by Jarvis Jones second when providing the group of comments in second area 1520.

Providing User Rankings

Figure 16:
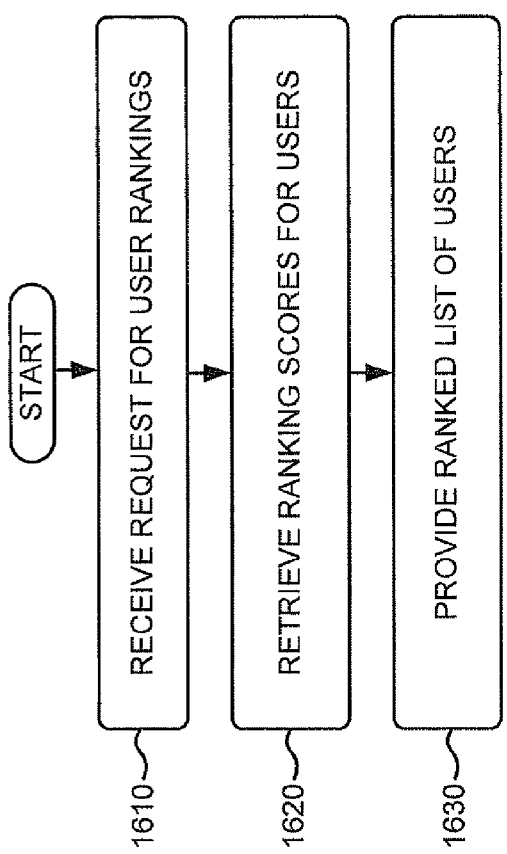
FIG. 16 is a diagram of an exemplary process for providing a ranked list of users.

FIG. 16 is a flowchart of an exemplary process for providing user rankings. In one implementation, the process of FIG. 16 may be performed by one or more components within server 220, client 210, or a combination of client 210 and server 220. In another implementation, the process may be performed by one or more components within another device or a group of devices separate from or including client 210 and/or server 220. Also, while FIG. 16 shows blocks in a particular order, the actual order may differ. For example, some blocks may be performed in parallel or in a different order than shown in FIG. 16.

The process of FIG. 16 may include receiving a request for user rankings (block 1610). In one implementation, server 220 may receive, from a client 210, a request for a ranking of the users of the system. The request may be submitted to server 220 in response to a command from a user of client 210 (e.g., in response to the user selecting a link or button on a provided graphical user interface, in response to the user selecting a menu item, in response to the user submitting a request for a particular web page, etc.).

The process may further include retrieving user ranking information from a database, such as database 600 or another database (block 1620). For example, server 220 may access database 600 and retrieve information identifying the users (e.g., from field 610) and the corresponding ranking values from user ranking field 620.

The process may include providing the user ranking information (block 1630). For example, server 220 may provide the user ranking information, sorted based on rank (e.g., with the highest ranking user listed first). FIG. 17 is a diagram of an exemplary graphical user interface 1700 that may provide user ranking information. As illustrated in FIG. 17, graphical user interface 1700 may provide a ranked list of users. As illustrated, user "Paul Bunyan" is the highest ranking user. The rankings, as described above, may be based on the ranking scores stored in database 600. Each user may be associated with information, such as the number of comments that the user authored. By providing user rankings, users of the system will be encouraged to author comments, attempting to become the highest ranking user.

CONCLUSION

Implementations, as described herein, may determine ranking scores for comments based on, among other things, the reputations of the users who authored the comments. In addition, ranking scores for users may be determined based on, among other things, measures of the quality of the comments that the users authored. Moreover, the ranking scores of the comments may be determined at the same time that the ranking scores of the users are determined and using the same process used for determining the ranking scores of the users.

The foregoing description provides illustration and description, but is not intended to be exhaustive or to limit the invention to the precise form disclosed. Modifications and variations are possible in light of the above teachings or may be acquired from practice of the invention.

For example, while particular manners of calculating user ranking scores and comment ranking scores were described above with respect to FIGS. 10 and 12, the user ranking scores and comment ranking scores may be determined in other ways.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor that transforms the general purpose processor to a special-purpose processor that functions according to the exemplary processes described above).

Further, it has been described that scores are generated for users and comments. The scoring scheme has been described where higher scores are better than lower scores. This need not be the case. In another implementation, the scoring scheme may be switched to one in which lower scores are better than higher scores.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method performed by one or more server devices, the method comprising:
   simultaneously calculating, using a processor of the one or more server devices, first ranking scores for a plurality of users and second ranking scores for a plurality of comments authored by the plurality of users,
   simultaneously calculating the first ranking scores and the second ranking scores including:
   modifying the first ranking scores using the second ranking scores, and
   modifying the second ranking scores using the first ranking scores; and
   providing, using a processor of the one or more server devices, one or more of:
   a first ranked list that includes information identifying the plurality of users,
   the information identifying the plurality of users being ordered based on the first ranking scores, or
   a group of comments of the plurality of comments, comments, in the group of comments, being ordered based on the second ranking scores.

2. The method of claim 1, where modifying the first ranking scores and modifying the second ranking scores continues until the first ranking scores and the second ranking scores converge.

3. The method of claim 1, where the first ranking scores and the second ranking scores are modified a predetermined quantity of times.

4. The method of claim 1, where modifying the first ranking scores includes:
   combining one of the first ranking scores with one or more of the second ranking scores,
   the one of the first ranking scores being associated with one user of the plurality of users, and the one or more of the second ranking scores being associated with one or more comments, of the plurality of comments, authored by the one user.

5. The method of claim 1, where the plurality of users includes a first user and a second user,
where the first ranking scores include a first score associated with the first user and a second score associated with the second user,
where the method further comprises:
determining a relationship between the first user and the second user; and
where modifying the first ranking scores includes:
modifying the first score using the second score based on the relationship, and
modifying the first score using one or more of the second ranking scores based on the one or more of the second ranking scores being associated with one or more of the plurality of comments authored by the first user.

6. The method of claim 1, where modifying the first ranking scores includes:
modifying the first ranking scores based on measures of quality of the plurality of comments.

7. The method of claim 1, where modifying the second ranking scores includes:
modifying the second ranking scores based on measures of reputations of the plurality of users.

8. A non-transitory computer-readable medium storing instructions, the instructions comprising:
one or more instructions that, when executed by one or more processors, cause the one or more processors to:
simultaneously calculate first ranking scores for a plurality of users and second ranking scores for a plurality of comments authored by the plurality of users,
the one or more instructions to simultaneously calculate the first ranking scores and the second ranking scores including:
one or more instructions that, when executed by the one or more processors, cause the one or more processors to:
modify the first ranking scores using the second ranking scores, and
modify the second ranking scores using the first ranking scores; and
provide one or more of:
a first ranked list that includes information identifying the plurality of users,
the information identifying the plurality of users being ordered based on the first ranking scores, or
a group of comments of the plurality of comments, comments, in the group of comments, being ordered based on the second ranking scores.

9. The non-transitory computer-readable medium of claim 8, where the one or more instructions to modify the first ranking scores and the one or more instructions to modify the second ranking scores continue until the first ranking scores and the second ranking scores converge.

10. The non-transitory computer-readable medium of claim 8, where the first ranking scores and the second ranking scores are modified a predetermined quantity of times.

11. The non-transitory computer-readable medium of claim 8, where the one or more instructions to modify the first ranking scores include:
one or more instructions that, when executed by the one or more processors, cause the one or more processors to:
modify one of the first ranking scores with one or more of the second ranking scores,
the one of the first ranking scores being associated with one user of the plurality of users, and
the one or more of the second ranking scores being associated with one or more comments, of the plurality of comments, authored by the one user.

12. The non-transitory computer-readable medium of claim 8, where the plurality of users includes a first user and a second user,
where the first ranking scores include a first score associated with the first user and a second score associated with the second user,
where the instructions further comprise:
one or more instructions that, when executed by the one or more processors, cause the one or more processors to determine a relationship between the first user and the second user; and
where the one or more instructions to modify the first ranking scores include:
one or more instructions that, when executed by the one or more processors, cause the one or more processors to:
modify the first score using the second score based on the relationship, and
modify the first score using one or more of the second ranking scores based on the one or more of the second ranking scores being associated with one or more of the plurality of comments authored by the first user.

13. The non-transitory computer-readable medium of claim 8, where the one or more instructions to modify the first ranking scores include:
one or more instructions that, when executed by the one or more processors, cause the one or more processors to modify the first ranking scores based on measures of quality of the plurality of comments.

14. The non-transitory computer-readable medium of claim 8, where the one or more instructions to modify the second ranking scores include:
one or more instructions that, when executed by the one or more processors, cause the one or more processors to modify the second ranking scores based on measures of reputations of the plurality of users.

15. A device comprising:
one or more processors to:
simultaneously calculate first ranking scores for a plurality of users and second ranking scores for a plurality of comments authored by the plurality of users,
when simultaneously calculating the first ranking scores and the second ranking scores, the one or more processors being to:
modify the first ranking scores using the second ranking scores, and
modify the second ranking scores using the first ranking scores; and
provide one or more of:
a first ranked list that includes information identifying the plurality of users,
the information identifying the plurality of users being ordered based on the first ranking scores, or
a group of comments of the plurality of comments,
the comments in the group of comments being ordered based on the second ranking scores.

16. The device of claim 15, where, when simultaneously calculating the first ranking scores and the second ranking scores, the one or more processors are further to:

continue modifying the first ranking scores and the second ranking scores until the first ranking scores and the second ranking scores converge.

17. The device of claim 15, where, when modifying the first ranking scores, the one or more processors are to:

combine one of the first ranking scores with one or more of the second ranking scores, the one of the first ranking scores being associated with one user of the plurality of users, and the one or more of the second ranking scores being associated with one or more comments, of the plurality of comments, authored by the one user.

18. The device of claim 15, where the plurality of users includes a first user and a second user, where the first ranking scores include a first score associated with the first user and a second score associated with the second user, where the one or more processors are further to:

determine a relationship between the first user and the second user; and where, when modifying the first ranking scores, the one or more processors are to:

modify the first score using the second score based on the relationship, and modify the first score using one or more of the second ranking scores based on the one or more of the second ranking scores being associated with one or more of the plurality of comments authored by the first user.

19. The device of claim 15, where, when modifying the first ranking scores, the one or more processors are to:

modify the first ranking scores based on measures of quality of the plurality of comments.

20. The device of claim 15, where, when modifying the second ranking scores, the one or more processors are to:

modify the second ranking scores based on measures of reputations of the plurality of users.

* * * * *